(12) United States Patent
Klabunde et al.

(10) Patent No.: US 6,216,383 B1
(45) Date of Patent: Apr. 17, 2001

(54) EARWIG INSECT TRAP

(76) Inventors: Trent L. Klabunde; Cynthia R. Saynor, both of 35805 89th Pl., Twin Lakes, WI (US) 53181-9507

( * ) Notice: Subject to any disclaimer, the term of this patent is extended or adjusted under 35 U.S.C. 154(b) by 0 days.

(21) Appl. No.: 09/206,763

(22) Filed: Apr. 7, 1998

Related U.S. Application Data

(63) Continuation-in-part of application No. 08/620,423, filed on Mar. 22, 1996, now abandoned.

(51) Int. Cl.$^7$ ..................................................... A01M 1/10
(52) U.S. Cl. ............................................. 43/121; 43/107
(58) Field of Search ....................................... 43/107, 121

(56) References Cited

U.S. PATENT DOCUMENTS

| | | | | |
|---|---|---|---|---|
| 140,954 | * | 7/1873 | Rubarth | 43/121 |
| 263,222 | * | 8/1882 | Reynolds | 43/107 |
| 379,581 | * | 3/1888 | Kell | 43/121 |
| 658,663 | * | 9/1900 | Lundy | 43/121 |
| 1,265,481 | * | 5/1918 | Mosby | 43/121 |
| 1,312,573 | * | 8/1919 | Nee Derenne | 43/107 |
| 1,464,394 | * | 8/1923 | Pollock | 43/121 |
| 1,471,986 | * | 10/1923 | Voges | 43/121 |
| 1,865,713 | * | 7/1932 | Taylor | 43/107 |
| 1,882,380 | * | 10/1932 | Braun | 43/107 |
| 2,046,430 | * | 7/1936 | Rutherford | 43/107 |
| 2,255,360 | * | 9/1941 | Miller | 43/121 |
| 3,807,081 | * | 4/1974 | Chapiewsky | 43/118 |
| 4,592,163 | * | 6/1986 | Wilson | 43/107 |
| 4,698,934 | * | 10/1987 | Gonzalez et al. | 43/121 |
| 4,872,282 | * | 10/1989 | Caldwell et al. | 43/121 |
| 5,157,866 | * | 10/1992 | Rosie | 43/121 |
| 5,253,450 | * | 10/1993 | Muramatsu | 43/122 |
| 5,392,560 | * | 2/1995 | Donahe et al. | 43/107 |
| 6,112,454 | * | 9/2000 | Plato et al. | 43/121 |

FOREIGN PATENT DOCUMENTS

| | | | |
|---|---|---|---|
| 2717987 | * | 10/1995 | (FR) . |
| 2052942 | * | 2/1981 | (GB) . |
| 10-215749 | * | 8/1998 | (JP) . |

* cited by examiner

*Primary Examiner*—Darren W. Ark
(74) *Attorney, Agent, or Firm*—Ronald P. Brockman

(57) ABSTRACT

A lower receptacle includes sidewalls having an upper edge. The receptacle is adapted to contain a quantity of fluid. A sleeve holds the lower receptacle. An upper lid has a conical upper surface and a plurality of vertical access ports. An access ramp leads crawling insects gradually upward to the ports. A rain shield forms an apex of the upper lid. The upper lid is removably affixable to the lower receptacle at the upper edge of the sidewalls.

2 Claims, 5 Drawing Sheets

EARWIG INSECT TRAP

CROSS REFERENCE TO RELATED APPLICATIONS

This application is a Continuation-In-Part of application Ser. No. 08/620,423, filed Mar. 22, 1996, now abandoned.

BACKGROUND OF THE INVENTION

1. Field of the Invention

The present invention relates generally to the controlling of common garden type crawling insects and, more particularly, to trapping and disposing of such insect pests. Specifically, an apparatus for trapping and collecting common earwigs is disclosed.

2. Description of the Related Art

Insects and general pest control problems are a nuisance for home and building owners. Costly property damage, unsightliness, and health problems can occur from uncontrolled infestations of insects. In North America, earwigs pose a particular problem due to their abundance, their nocturnal behavior, and their lack of natural predators. Although many chemical pesticides are available, the expense, as well as the personal and environmental dangers of using such means to control insect populations in and around residential areas is usually a concern for many individuals.

Several nonchemical methods of trapping or controlling insects, adaptable to earwigs, are known in the related art. For example, in U.S. Pat. No. 5,253,450, issued in the name of Muramatsu, an insect trap is disclosed comprising a multifaceted, hollow chamber and a tubular inlet. A trap of this design as disclosed, however, is limited in size, application, and reusability.

Another example is particularly adapted for use with earwigs. In U.S. Pat. No. 5,157,866, issued in the name of Rosie, an earwig collector is disclosed which traps earwigs within a plurality of relatively dark and narrow passageways. Thriving on areas of high moisture content, earwigs seek areas such as moist cracks and crevices under boards, stones, plant debris and in shallow cavities in the ground. Although the Rosie disclosure also takes some advantage of the behaviors of these insects, as disclosed in Rosie the earwigs are collected while alive, and thereby need to be handled and ultimately disposed of as such.

Consequently, a need has been felt for providing an apparatus and method particularly adapted to trapping and killing earwigs in an inexpensive, chemical free, and reusable manner.

SUMMARY OF THE INVENTION

It is therefore an object of the present invention to provide an improved earwig trap that captures and kills earwigs.

It is a feature of the present invention to provide an improved earwig trap which can be reused, and requires no toxic chemical additives.

It is another object of the present invention to provide an improved earwig trap which has interchangeable components, permitting the trap to be used both indoors and outdoors.

The earwig trap of the present invention includes a lid having a plurality of access ports formed there-through. A generally truncated-cone-shaped access ramp extends from an outer periphery of the lid to the access ports. A receptacle is configured to retain the lid thereon. A liquid is contained within the receptacle. The liquid acts as a lure, and also drowns the insects once they are inside the receptacle.

For use indoors, a generally truncated-cone-shaped base is configured to receive the receptacle therein. The base rests on a floor. For use outdoors, a containing sleeve replaces the base. The containing sleeve is buried and receives the receptacle therein.

An advantage of the present invention is that it is inexpensive, as well as easy to operate.

Another advantage of the present invention is that it is reusable, requiring minimal maintenance.

Further, a preferred embodiment of the present invention can be used to trap and kill most types of crawling insects.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
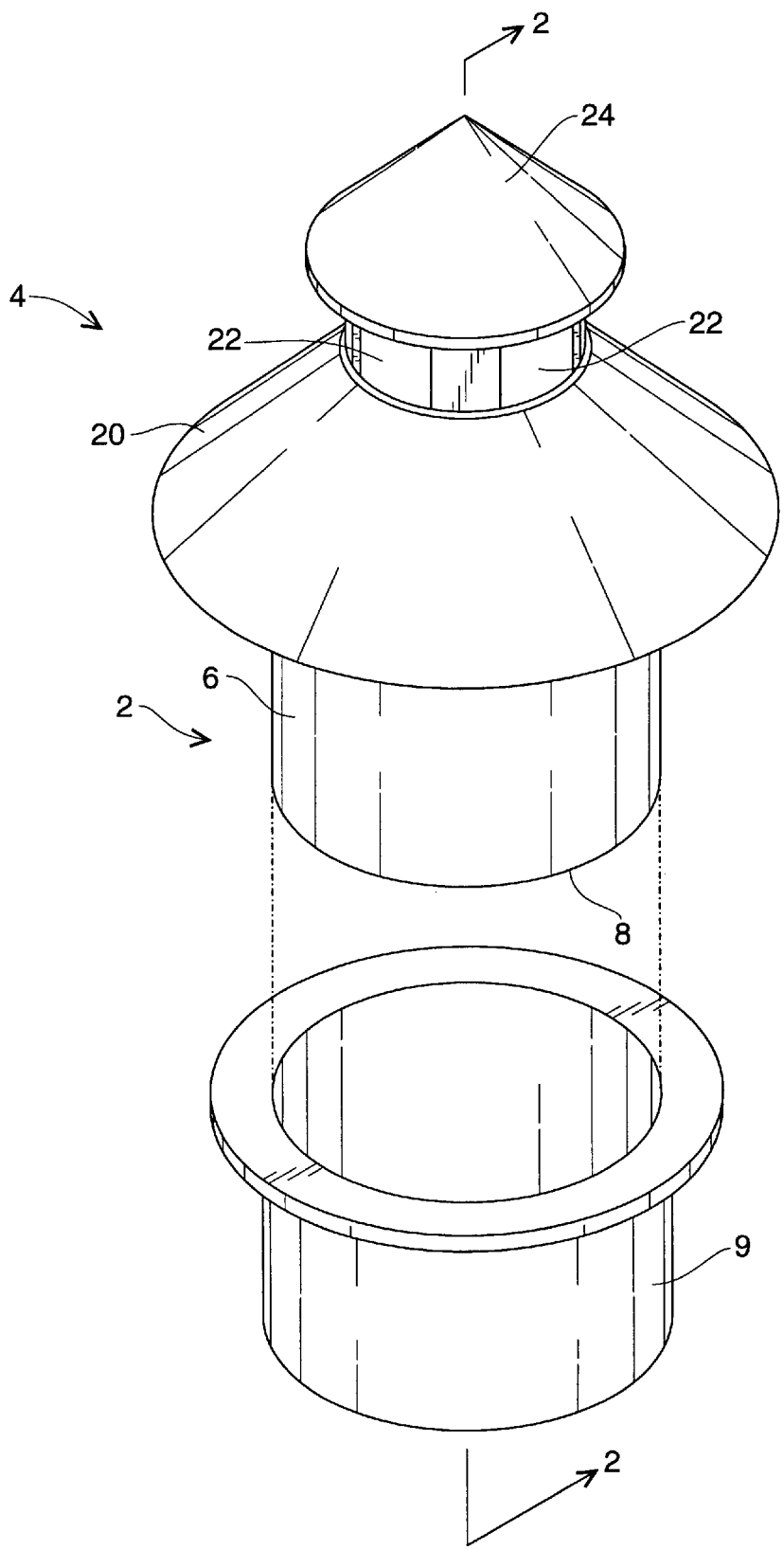
FIG. 1 is a perspective view of the earwig insect trap according to the preferred embodiment of the present invention.

Referring now to the figures, an earwig insect trap, is shown, according to the present invention, having a lower receptacle 2, an upper lid 4, and a containing sleeve 9. The lower receptacle 2 is generally rounded, with vertical sidewalls 6 and a generally flat bottom 8. The lower receptacle 2 fits within and is supported and contained by the containing sleeve 9. Further, the lower receptacle 2 is capable of containing a quantity of fluid 10, which will be used as a lure and will be described in detail below.

Figure 2:
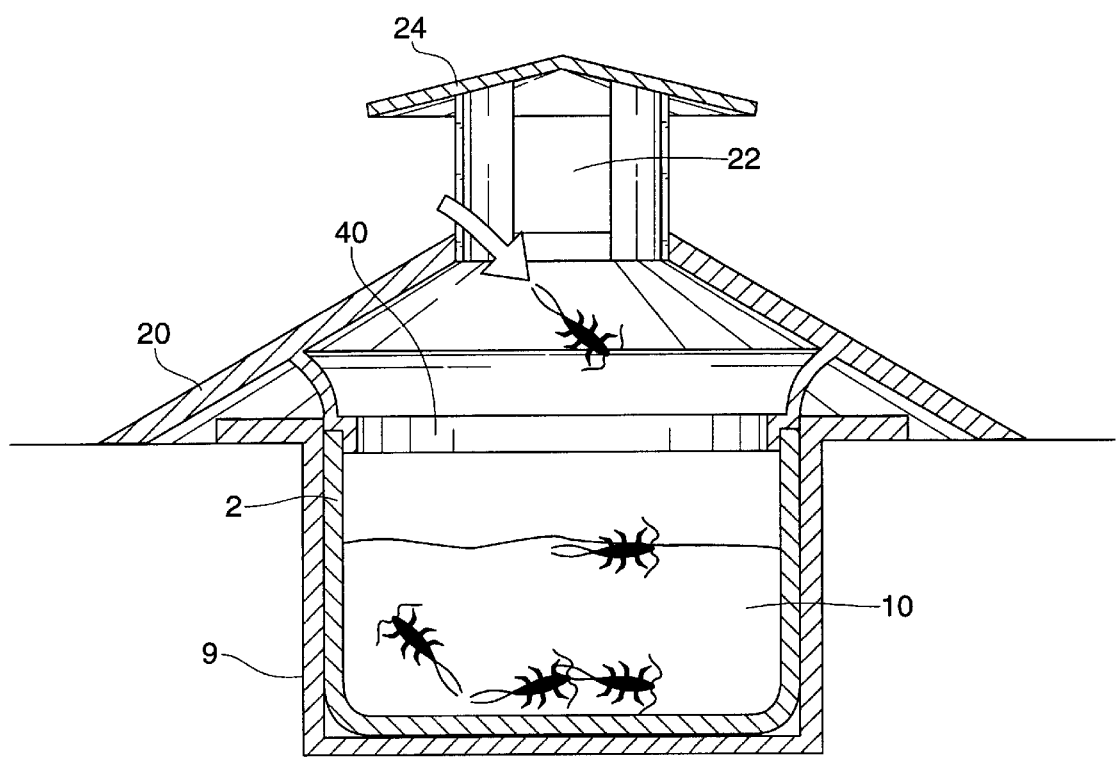
FIG. 2 is a cross sectional view taken along line II—II in FIG. 1.

The upper lid 4 has a generally sloped, conical upper surface that is composed of an access ramp 20 which leads a crawling insect gradually upward to a plurality of access ports 22. In order to prevent rain or ground runoff water from flooding the trap 1 and thereby permit escape of any trapped insects, the access ramp 20 is gradually sloped to permit rain to run down and away from the receptacle 2. The access ports 22 are vertical penetration, similar to a doorway, for the same reasons. A rain shield 24 forms the apex of the upper lid 4 and provides further shielding of rainwater away from the access ports 22, down the access ramp 20, and away from the receptacle 2. Further, the upper lid 4 is removably connected in a sealed manner to the lower receptacle 2 at the upper edge of the sidewall 6, as shown best in FIG. 2. This is accomplished with a connection means such as a firmly fitted sleeve 40, a latching seam (not shown); a jar-type screw cap (not shown), or a similar conventional means. When assembled, the entire trap 1 resembles a small house-like shape.

Figure 3A:
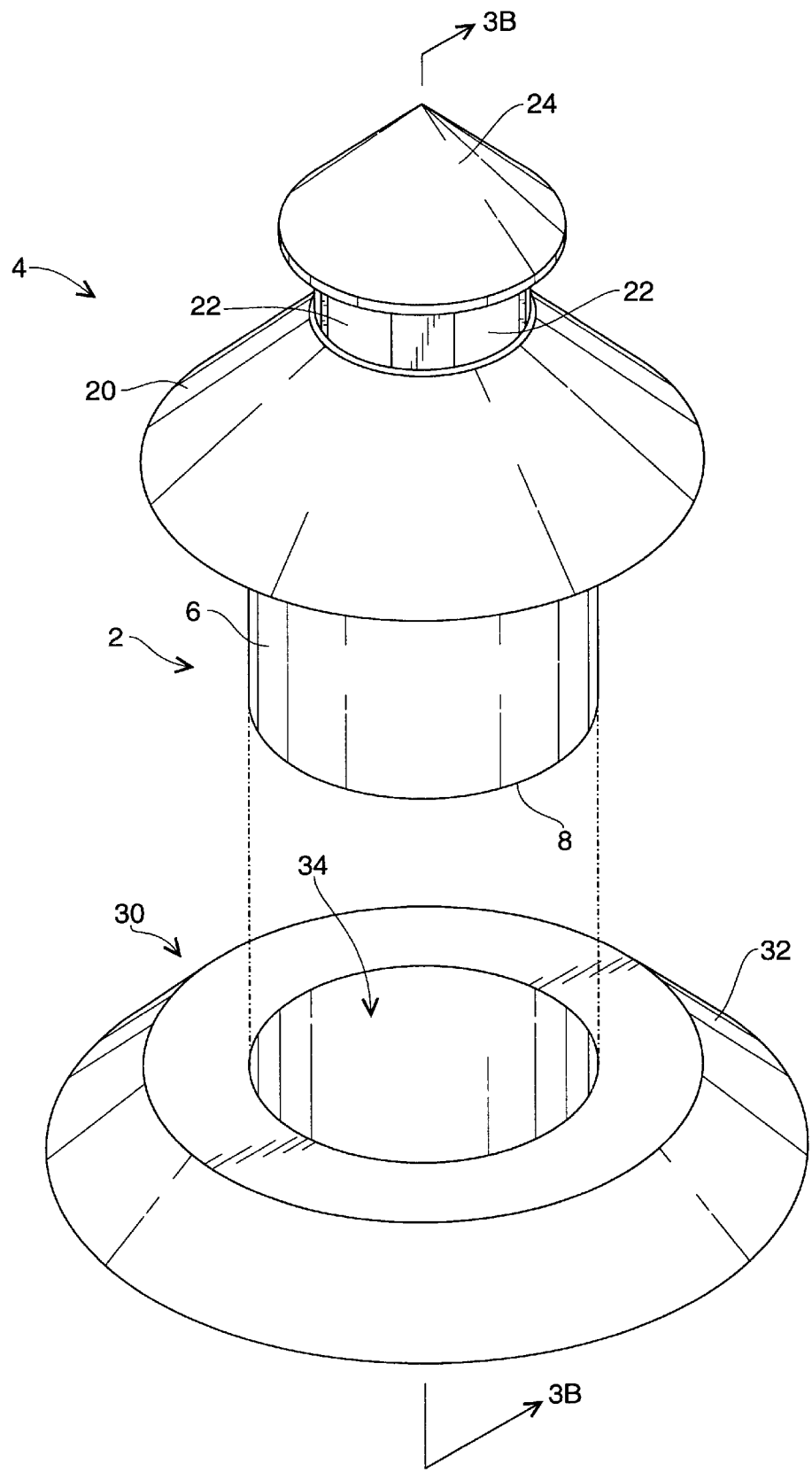
FIG. 3A is a perspective view of the trap used with a base instead of the containing sleeve.
Figure 3B:
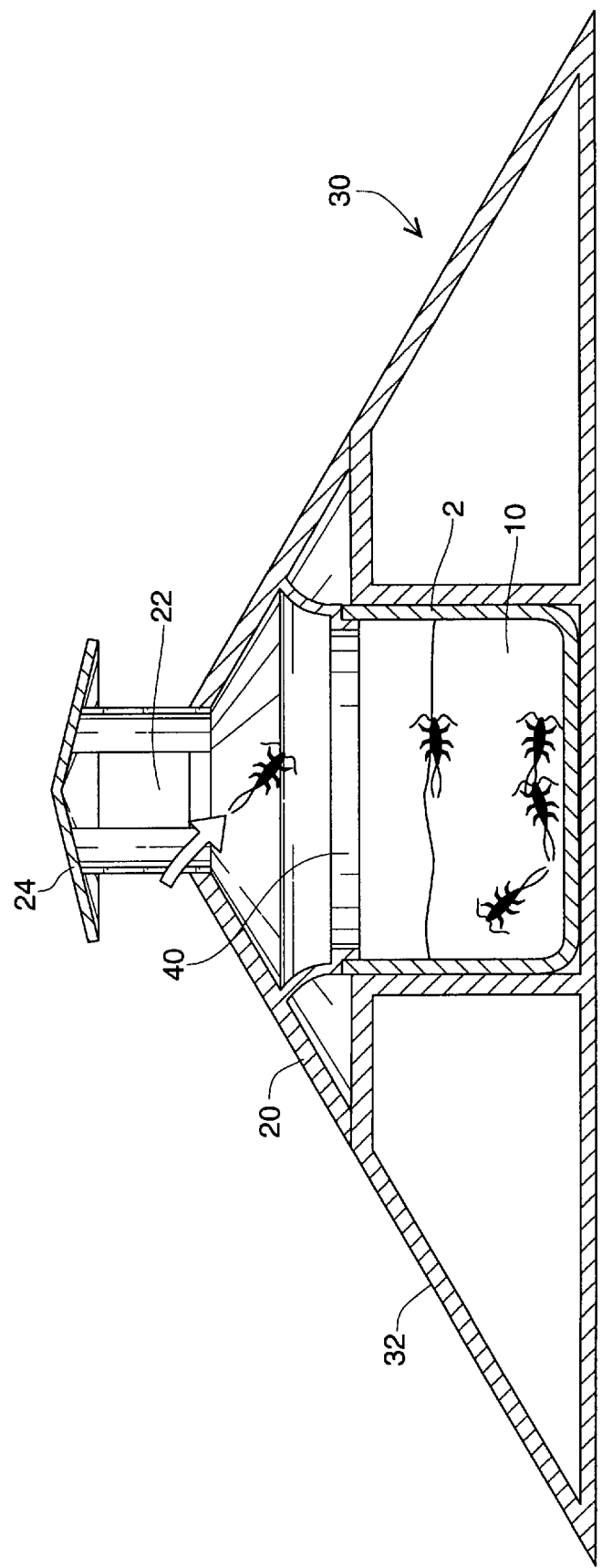
FIG. 3B is a cross-sectional view taken along line 3B—3B of FIG. 3A.
Figure 4:
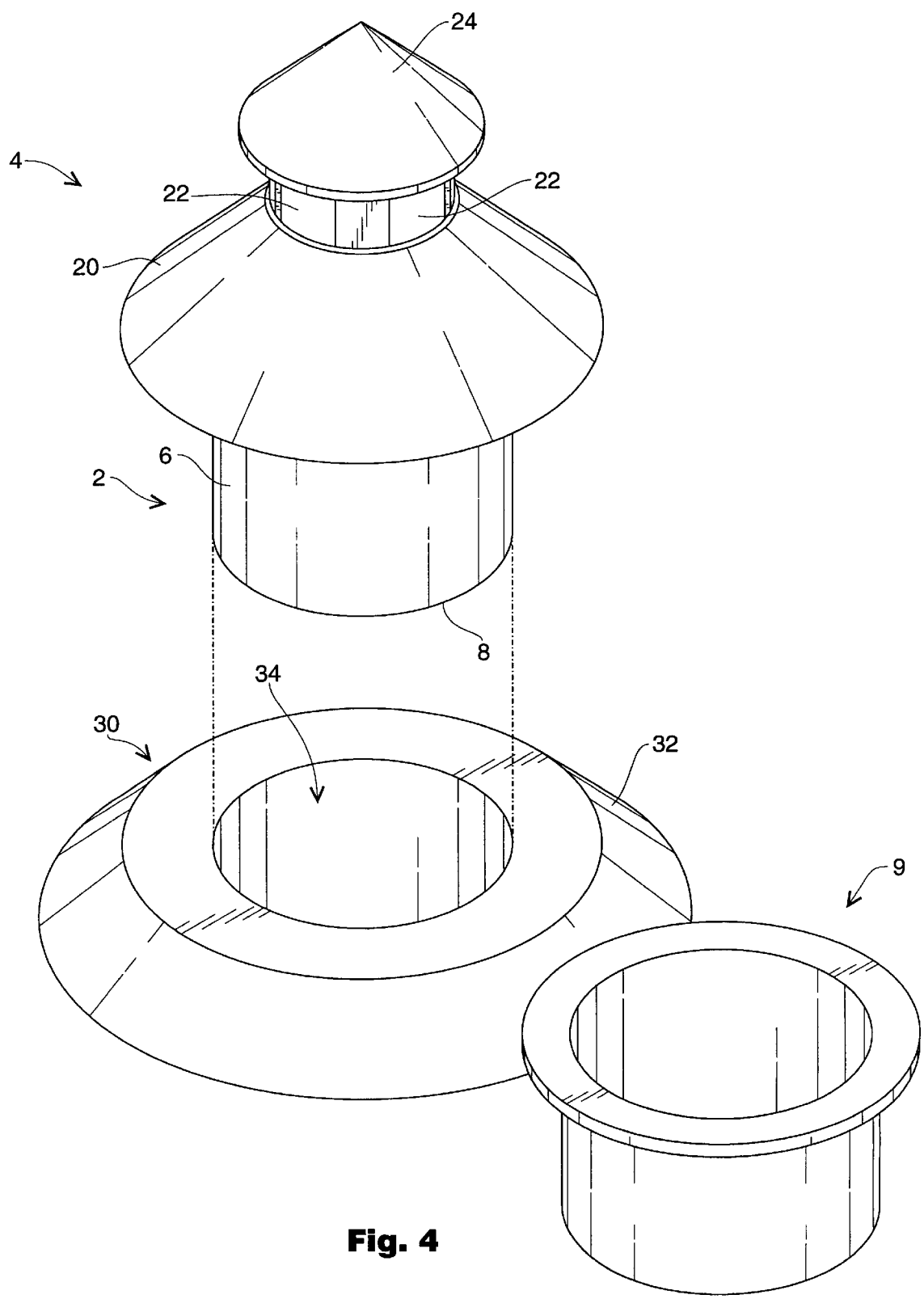
FIG. 4 is a perspective view of all of the components of the present invention together, including the base and the containing sleeve, which are interchangeable with one another.

For indoor use, a generally truncated-cone-shaped base 30 is provided as shown in FIG. 3A and FIG. 3B. The base 30 has a ramped outer edge 32 and forms an internal cavity 34. The receptacle 2 fits within the internal cavity 34 such that the ramped outer edge 32 aligns with the access ramp 20. In this configuration, earwigs can easily gain access to any bait within the receptacle, even when used indoors.

2. Operation of the Preferred Embodiment

To use the present invention, the user must first determine a placement location. An outdoor location, next to the foundation of a house, near a well, next to a central air conditioner unit, or around garden, flowerbed, woodpile or the like would provide an adequate location that may help prevent earwigs from entering a structure. The placement of one trap every 10 feet apart near the foundation creates an ideal barrier around a home. Next, the containing sleeve 9 is placed below ground level, and the receptacle 2 is placed within the containing sleeve 9 such that the upper edge of the sidewall 6 is at ground level. Only a hole large enough to accommodate the containing sleeve 9 is necessary. The containing sleeve 9 also functions to keep the receptacle 2 from being in direct contact with the soil.

With the receptacle 2 placed at ground level, a fluid 10 is introduced to act as a lure or a bait. It is felt that a 1" fluid level of water or similar fluid would provide a moisture level sufficient to take advantage of the earwig's habit of congregating into moist and dark areas and attract earwigs into the access ports 22 while at the same time providing a sufficient level to drown the insects as they fall into the receptacle 2. Also, it has been found that by using ordinary beer as a lure fluid earwigs are particularly well attracted. Upon removal of the upper lid 4 and inspection for trapped insects the receptacle 2 can then be removed, the contents disposed of, the receptacle 2 cleaned, and then replaced in its original or a new location.

To use the trap indoors, use the base 30 instead of the containing sleeve 9. Insert the receptacle 2 into the base 30, fill the receptacle 2 with water and place the lid 4 onto the receptacle 2.

The foregoing description is included to illustrate the operation of the preferred embodiment and is not meant to limit the scope of the invention. The scope of the invention is to be limited only by the following claims.

What is claimed is:

1. An insect trap kit for use indoors and outdoors, the insect trap kit comprising:

a. a lid having at least one access port formed therethrough, the at least one access port being formed through a vertical wall of the lid, the lid also having a generally truncated cone-shaped access ramp extending from an outer periphery of the lid to the at least one access port;

b. a receptacle configured to retain the lid thereon and adapted to contain an insect attractant therein, an upper portion of the receptacle being connected to a lower portion of the lid when the lid is retained on the receptacle;

c. a generally truncated cone-shaped base for use indoors, the base having first and second ends and a cavity extending into the base from the first end, the base being smaller at the first end than at the second end, the second end adapted to rest on a horizontal surface, the base configured to receive the receptacle through the first end and in the cavity, an outer perimeter of the base at the first end aligning with the outer periphery of the lid when the receptacle is received within the base and the lid is retained on the receptacle, an outer surface of the base having the same slope as the access ramp when the receptacle is received within the base and the lid is retained on the receptacle and the second end of the base is resting on a horizontal surface;

d. a containing sleeve for use outdoors and adapted for burial, the sleeve configured to receive the receptacle therein, the outer periphery of the lid resting on top of the ground when the receptacle is received within the containing sleeve and the lid is retained on the receptacle and the containing sleeve is buried in the ground; and whereby an insect will be attracted by the insect attractant, the insect thus being led to crawl upward along the base and then upward along the access ramp when the insect trap is used indoors, the insect being led to crawl upward along only the access ramp when the insect trap is used outdoors, the insect then falling through the at least one access port and into the insect attractant within the receptacle.

2. The insect trap kit of claim 1, further comprising a rain shield forming an apex of the lid and adapted to shield the at least one access port from falling rain.

\* \* \* \* \*